US007006485B2

(12) United States Patent
Bi et al.

(10) Patent No.: US 7,006,485 B2
(45) Date of Patent: Feb. 28, 2006

(54) METHODOLOGY OF REDUCING AREAS WITH MULTIPLE DOMINANT PILOTS BY INSTALLING SIMULCASTING ELEMENTS OR OMNI-DIRECTIONAL BASE STATION

(75) Inventors: Qi Bi, Morris, NJ (US); Wen-Yi Kuo, Parsippany, NJ (US); Martin Howard Meyers, Montclair, NJ (US); Charles Albert Sanders, Morristown, NJ (US); Carl Francis Weaver, Hanover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 570 days.

(21) Appl. No.: 09/990,468

(22) Filed: Nov. 21, 2001

(65) Prior Publication Data

US 2002/0036999 A1 Mar. 28, 2002

Related U.S. Application Data

(63) Continuation of application No. 08/990,625, filed on Dec. 15, 1997, now abandoned.

(51) Int. Cl.
*H04B 7/216* (2006.01)
(52) U.S. Cl. .................................... 370/342; 455/11.1
(58) Field of Classification Search ................ 370/310, 370/315, 316, 319, 320, 328, 329, 331, 332, 370/335, 342; 455/7, 9, 11.1
See application file for complete search history.

(56) References Cited

U.S. PATENT DOCUMENTS

| 5,790,938 | A | * | 8/1998 | Talarmo .................... 455/11.1 |
| 5,845,192 | A | * | 12/1998 | Saunders .................... 455/11.1 |
| 5,983,072 | A | * | 11/1999 | Schroderus ................ 455/11.1 |
| 6,108,364 | A | * | 8/2000 | Weaver et al. .............. 375/130 |

* cited by examiner

*Primary Examiner*—Bob A. Phunkulh

(57) ABSTRACT

A method for reducing multiple dominant pilots in a CDMA transmission system comprises linking a transceiver element with a nearby base station for transporting signals between the transceiver element and the nearby base station. Transmitting from the transceiver element forward link signals of a nearby sector associated with the nearby base station. An apparatus is also described.

36 Claims, 3 Drawing Sheets

METHODOLOGY OF REDUCING AREAS WITH MULTIPLE DOMINANT PILOTS BY INSTALLING SIMULCASTING ELEMENTS OR OMNI-DIRECTIONAL BASE STATION

This application is a continuation of Ser. No. 08/990,625 filed on Dec. 15, 1997, now abandoned.

FIELD OF THE INVENTION

This invention relates to wireless communications, and more particularly to code division multiple access (CDMA) wireless communications.

BACKGROUND OF THE INVENTION

Wireless mobile communications provides the greatest convenience for users to access voice and data services essentially anywhere and anytime. CDMA communication systems are one of the most promising digital wireless communication systems that can provide the desired mix of voice and data services. In addition, CDMA systems have features such as soft handoff and frequency reuse which makes CDMA a much more attractive choice than other access technologies such as TDMA and GSM.

Soft handoff is a handoff technique that allows a mobile unit to communicate with two or more base stations at the same time. Soft handoff can not only eliminate the potential ping-ponging of handoff but also provides for a smooth transition at handoff without necessitating mute time. Unlike other access technologies, soft handoff can be implemented in CDMA systems because CDMA systems allows the same frequency to be reused between cells. In addition, allowing frequency reuse between cells in CDMA systems means that frequency planning, which is one of the most difficult tasks in other access technologies such as TDMA, GSM, and AMPS etc., is no longer necessary.

However, CDMA systems has its own set of issues and concerns. One issue related to successful soft handoff and allowing frequency reuse between cells everywhere is the interference pattern. In practical field deployment, there are unavoidable situations in some areas that result in the coexistence of several dominant pilots. That is, several base stations has roughly equal path loss to the same area. It should be noted that each base station has a unique pilot which serves as a beacon for that particular base station.

The issues associated with the situation of multiple dominant pilots are three folds. First, since several base stations are of roughly equal path loss, the signals from them are interfering each other. In order to maintain the call, all these base stations have to be involved in the soft handoff with the mobile unit sooner or later. If the mobile unit is moving at a fast relatively speed, then fast handoff is critical to the survival of the call. This fast handoff requirement presents a large challenge for both the mobile units and infrastructure on the processing hardware. Second, when a high number of base stations are involved in a soft handoff this presents a high overhead on the transmit power needs and degrades the actual capacity of the wireless system. Third, the areas which have the multiple dominant pilots are areas that have a higher probability of dropping calls or degrading voice quality.

It would be beneficial to reduce areas that can have multiple dominant pilots in place or equivalently to reduce the number of pilots that are within several dBs of the strongest pilot.

SUMMARY OF THE INVENTION

The present invention is a method for reducing multiple dominant pilots in a CDMA transmission system. The method comprising linking a transceiver element with a nearby base station for transporting signals between the transceiver element and the nearby base station. Transmitting from the transceiver element forward link signals of a nearby sector associated with the nearby base station.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for a CDMA system and shall be so described, the present invention is equally well suited for use with other systems including Wideband CDMA (W-CDMA).

CDMA modulation techniques are employed in communication systems in order to permit a large number of users to communicate. In a typical CDMA communication system, all communication channels are multiplexed into one or several common broadband frequencies. Each channel is differentiated by a unique spreading code. Prior to transmission, each channel's information signal is modulated with a spreading code in order to convert the information signal into a broadband signal. A receiver demodulates the received broadband signal by combining the broadband signal with the corresponding spreading code to recover the information signal. The spreading code is typically a binary code. Since the same wideband is available to all users, information signals in other channels may appear as co-channel interference or noise when the received signal is demodulated by the spreading code.

Figure 1:
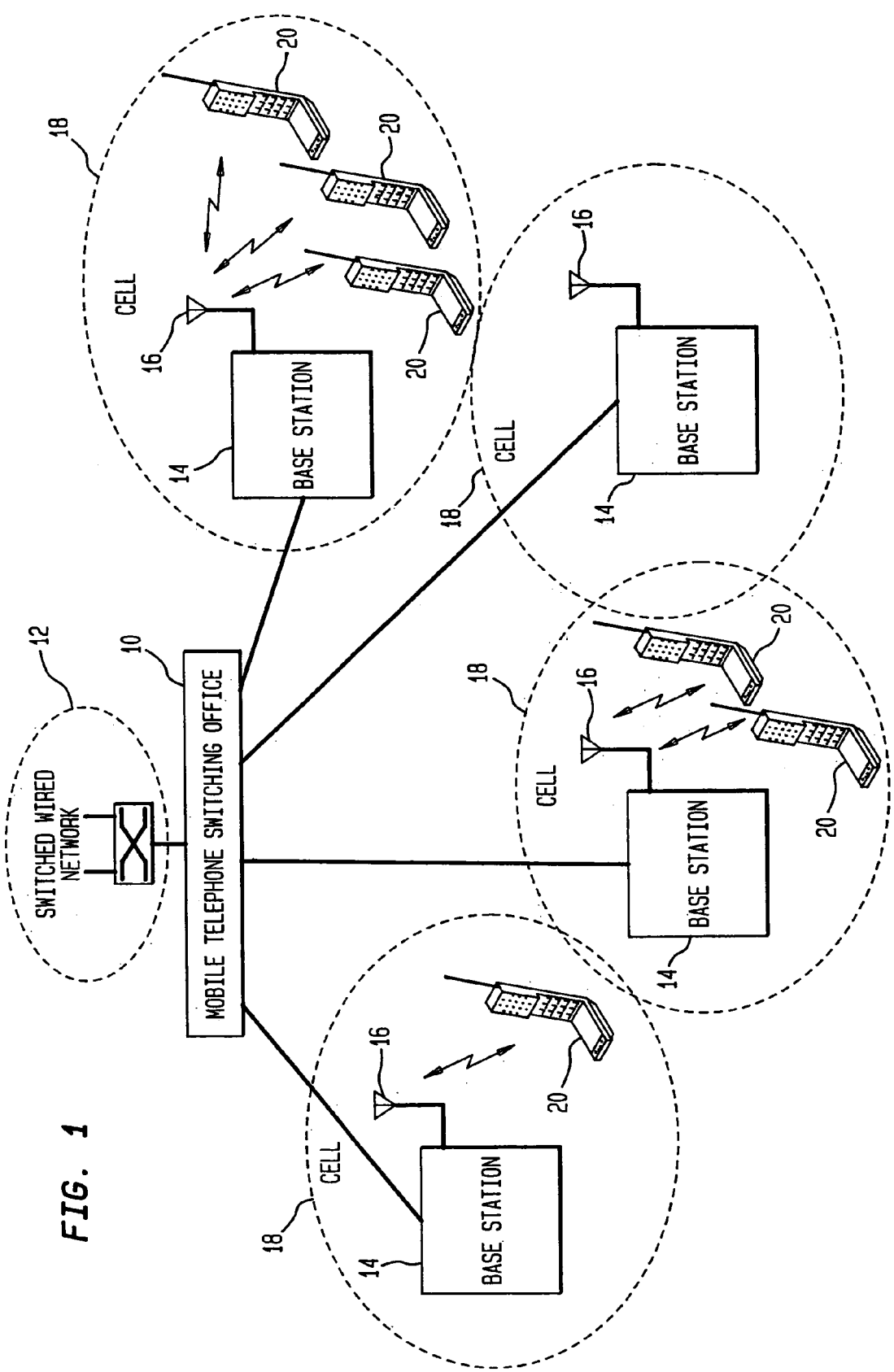
FIG. 1 is a representative block diagram of a typical wireless network.

Referring now to FIG. 1 there is shown a representative block diagram of a typical wireless network. A Mobile Telephone Switching Office (MTSO) 10, also know as a Mobile Switching Center (MSC), provides for switching calls between the wireless communication network and the switched wired network 12. The MTSO 10 controls the entire operation of a wireless communication system, setting up and monitoring all wireless calls, and tracking the location of all wireless-equipped vehicles traveling in the system, arranging hand-offs, and providing billing information. The MTSO 10 is connected to a plurality of base stations 14. The base station 14 is a fixed position multi-channel transceiver in the wireless network, which is coupled through a radio port to an antenna 16. The geographical area for which the base station 14 acts as the communication gateway is called a cell 18, the various base station 14 cell nodes are distributed in suitable locations. A mobile unit 20 communicates with the base station 14 within a particular cell 18 through a forward link and a reverse link.

Field deployment of CDMA systems result in an unavoidable situation that from time to time results in several dominant pilots in one area. The signals from several base stations are interfering with each other and with little motion or shadow fading change, the relative signal strength can change significantly. The existence of several dominant pilots has a negative effect on access success rate and the ability to have smooth and quick soft hand-offs. It would be beneficial to reduce the number of multiple dominant pilots as well as the areas they occur in.

The characteristics of an area having multiple dominant pilots is that the signal strength from several base stations 14 are within a close range of each other, such as within 3 to 6 dB. By the signals being so close, they interfere with each other such that with a small amount of motion by a mobile unit 20 or shadow fading change, the relative signal strength can change significantly. Two significant problems occur as a result of this characteristic. First, if a mobile unit 20 originates or responds to a page in the area having multiple dominant pilots, the mobile unit 20 can only lock on one pilot onto one base station 14. The mobile unit 20 sends out access probes to the base station 14 that it has locked on to, requesting services. Desirably, the mobile unit 20 will within a couple of seconds of call processing go into soft hand-off to secure the call. Before the call is secured and soft hand-off occurs, the mobile unit 20 is operating in simplex, talking with only one base station 14. The relative signal strength from the one base station 14 can change rapidly and significantly, which will result in the call being killed before it is secured. Second, if the mobile unit 20 with an on-going call enters an area having multiple dominant pilots, there is a high potential need to perform hand-off activities. If the mobile unit 20 is in medium, to high speed motion, then the hand-off speed need to be quick enough, otherwise the call quality will degrade and even result in the call being dropped.

Figure 2:
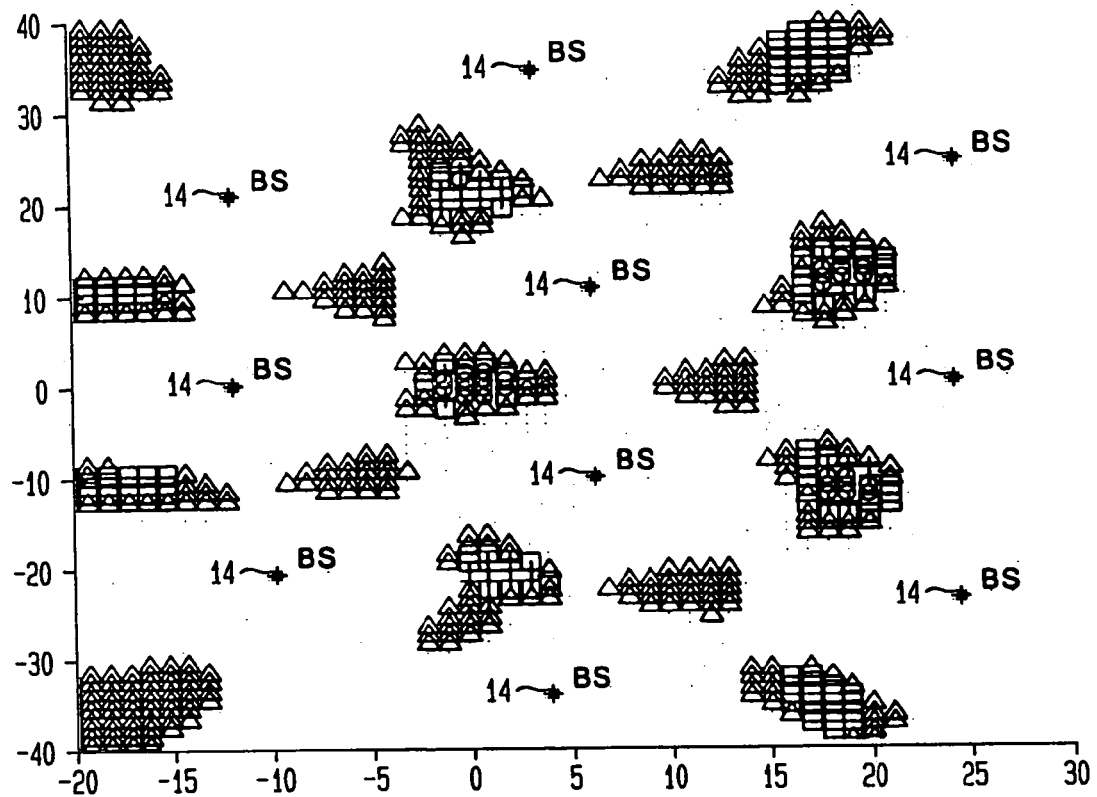
FIG. 2 is a graphical representation of pilot signals that are within 6 dBs of the strongest pilot signal for a typical CDMA system.
Figure 3:
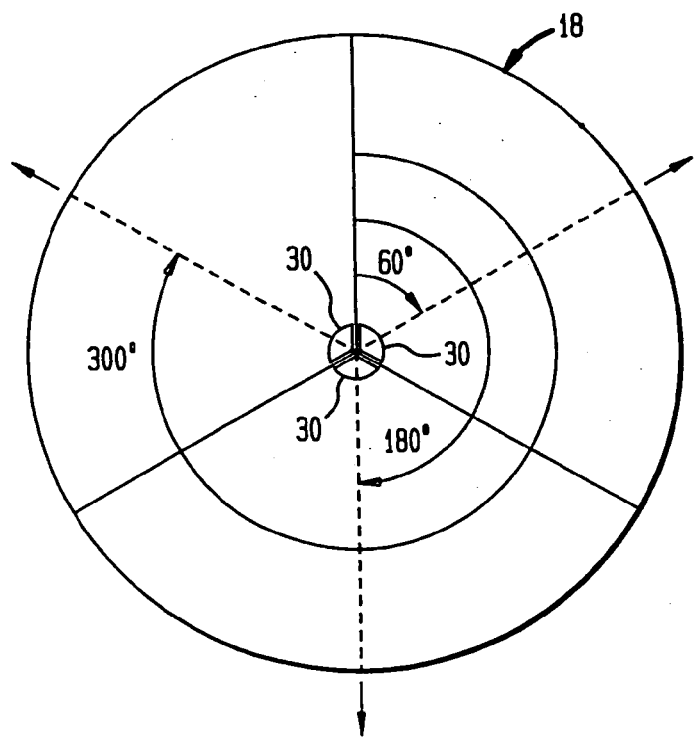
FIG. 3 is a diagrammatic representation of a CDMA cell showing three sectors.

Referring to FIG. 2 there is shown a graphical representation of pilot signals that are within 6 dBs of the strongest pilot signal for a typical CDMA system showing ten base stations 14 which represent ten cells 18. Referring to FIG. 3 it can be seen that each cell 18 is typically composed of three sectors. A 92 degree antenna is used for the sectored antenna 30. The three sector antennas 30 are pointed in directions of 60 degrees, 180 degrees and 300 degrees. Referring back to FIG. 2, an asterisk represents the placement of the three sector antennas for a cell 18. The number of multiple pilots within 6 dB of the strongest pilot are represented by a dot for two, by a triangle for three, by a square for four, by a plus for five and by a circle for six or more.

In order to reduce the number of dominant pilots in a high density area of multiple dominant pilots, the present invention utilizes a simulcasting element or an omni-directional cell. The simulcasting element or omni-directional cell is inserted in a high density area of multiple dominant pilots. The increased local signal strength from the simulcasting element or omni-direction cell reduces the number of dominant pilots at each geographical location. The simulcasting element is essentially a repeater which transmits the forward link signal obtained from a base station 14 and receives the reverse link signal from the mobile unit 20. The communication link between the simulcasting element or omni-direction cell and the base station 14 can be either wired or wireless.

Figure 4:
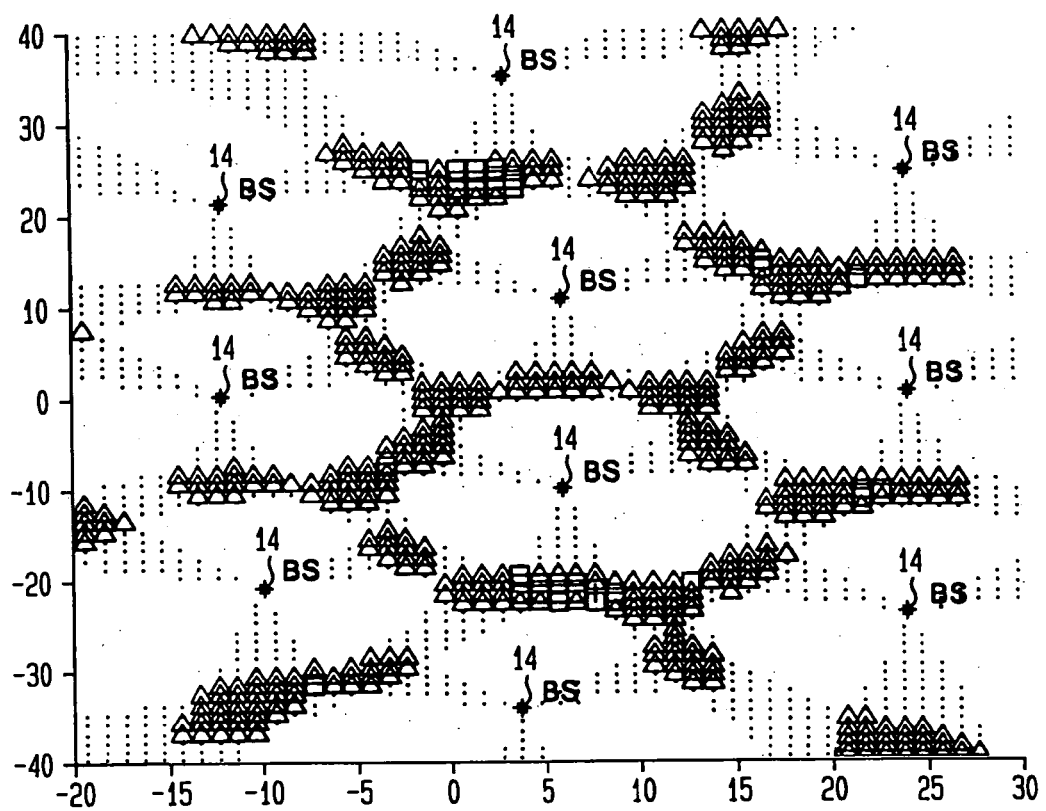
FIG. 4 is a graphical representation of pilot signals that are within 6 dBs of the strongest pilot signal for a CDMA system employing the present invention.

Referring to FIG. 4 there is shown a graphical representation of pilot signals that are within 6 dBs of the strongest pilot signal for a CDMA system employing the present invention showing ten base stations 14 which represent ten cells 18. An asterisk represents the placement of the three sector antennas for a cell 18. A star (five pointed) represents the placement of a simulcasting element 40. The number of multiple pilots within 6 dB of the strongest pilot are represented by a dot for two, by a triangle for three, by a square for four, by a plus for five and by a circle for six or more. Three simulcasting elements 40 are shown. Each simulcasting element has 10 dB less transmit power than a regular sector, and repeats a nearby sector's transmit and receive function.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for reducing the effect of multiple dominant pilots in a CDMA communication system comprising the steps of:

locating a fixed transceiver element in high density area of multiple dominant pilots linking said element with nearby base station for transporting and amplifying signals between said transceiver element and said nearby base station until the nearby base station is a dominant pilot signal; and transmitting from said fixed transceiver element forward link signals of a nearby sector associated with said nearby base station.

2. The method as recited in claim 1 further comprising the step of receiving reverse link signals at said transceiver element for said first nearby sector associated with said linked nearby base station.

3. The method as recited in claim 1 wherein the step of linking comprises linking by a wired connection.

4. The method as recited in claim 1 wherein the step of linking further comprises linking by a wireless connection.

5. The method as recited in claim 1 wherein the step of transmitting further comprises transmitting from said transceiver element with less power than transmitting from said first nearby sector associated with said linked nearby base station.

6. The method as recited in claim 5 wherein less power is approximately 10 dB less power.

7. The method as recited in claim 1 wherein said transceiver element is selectively associated with a second nearby sector associated with said linked nearby base station.

8. The method as recited in claim 1 wherein said transceiver element is selectively associated with a second nearby base station.

9. The method as recited in claim 1 wherein said transceiver element is a simulcasting element.

10. The method as recited in claim 1 wherein said transceiver element is an omni-directional base station.

11. A method for reducing the effect of multiple dominant pilots in a CDMA communication system comprising the steps of:

selecting at least one area having a high density area of multiple dominant CDMA pilots;

locating a transceiver element in said selected area;

linking said transceiver element with only one of a plurality of nearby base stations; and transmitting from said transceiver element forward link signals to said linked nearby base station.

12. The method as recited in claim 11 wherein the forward link signals are forward link signals of a nearby sector associated with said linked nearby base station.

13. The method as recited in claim 11 wherein said transceiver element is a simulcasting element.

14. The method as recited in claim 11 wherein said transceiver element is an omni-directional base station.

15. The method as recited in claim 11 further comprising the step of receiving reverse link signals at said transceiver element for a nearby sector associated with said nearby base station.

16. The method as recited in claim 11 wherein the step of linking further comprises linking by a wired connection.

17. The method as recited in claim 11 wherein the step of linking further comprises linking by a wireless connection.

18. The method as recited in claim 11 wherein the step of transmitting transmits with less power than a transmission from a nearby sector associated with said linked nearby base station.

19. The method as recited in claim 18 wherein the less power is approximately 10 dB less power.

20. The method as recited in claim 13 wherein said simulcasting element is selectively associated with a different nearby sector associated with said nearby base station.

21. The method as recited in claim 13 wherein said simulcasting element is selectively associated with a different nearby base station.

22. An apparatus for reducing the effect of multiple dominant pilots in a CDMA transmission system comprising:
   a transceiver located in an area of multiple dominant CDMA pilots wherein said transceiver transmits forward link signals of only one of a plurality of nearby base stations;
   a base station having an associated sector near said transceiver; and
   linking means coupling said transceiver to said base station for enabling transporting signals between said transceiver and said base station, and wherein said transceiver increases the signal strength of the signals of the one of the plurality of nearby base stations to reduce the number of dominant pilots.

23. The apparatus as recited in claim 22 wherein said transceiver is a repeater.

24. The apparatus as recited in claim 22 wherein said transceiver is an omni-directional base station.

25. The apparatus as recited in claim 22 wherein said transceiver transmits with less power than said base station.

26. The apparatus as recited in claim 23 wherein said repeater further comprises a receiver for receiving reverse link signals.

27. A method for reducing the number of dominant pilots in a CDMA system where the signal levels of such pilots within a particular geographical area interfaces with the systems ability to secure and to hand-off calls to other cells comprising of:
   determining the location within a geographical area where at least two of a plurality of interfering pilot signals exceed a given dB threshold level,
   placing within the determined location a simulcasting element for boosting the signal level of only one of the plurality of interfering pilot signals; and
   utilizing said simulcasting element to carry all signals from the cell served by the boosted interfering pilot signal.

28. The method of claim 27 wherein the simulcasting element is a repeater.

29. The method of claim 27 wherein the given dB threshold level is within a range of 3 to 6 dB of the local signal strength.

30. The method of claim 27 wherein the boosted interfering pilot signal is the local signal from a cell within the geographical area.

31. The method of claim 27 wherein the simulcasting element is an omni-directional cell.

32. The method of claim 30 wherein said simulcasting element receives forward link as well as reverse link signals said cell within the geographical area.

33. The method of claim 30 further including a wired link connecting said simulcasting element to said cell.

34. The method of claim 30 further including a wireless link connecting said simulcasting element to said cell.

35. A method of reducing interference, comprising:
   locating a transceiver element in an area of multiple dominant pilot signals; and
   transmitting, at the transceiver element, only one of the multiple dominant pilot signals so that the pilot signal transmitted by the transceiver element becomes the only dominant pilot signal.

36. The method of claim 35, further comprising:
   transmitting, at the transceiver element, forward link signals of the base station associated with the pilot signal transmitted by the transceiver element.

* * * * *